Nov. 28, 1967 A. GEESE ET AL 3,355,558

PUSH-BUTTON ACTUATED SWITCHES FOR DIAL TELEPHONE STATIONS

Filed July 26, 1965

3,355,558

PUSH-BUTTON ACTUATED SWITCHES FOR DIAL TELEPHONE STATIONS

Albert Geese and Erwin Awakowicz, Munich, Germany, assignors to Siemens & Halske Aktiengesellschaft, Munich, Germany Filed July 26, 1965, Ser. No. 474,829

Claims priority, application Germany, Aug. 25, 1964, S 92,787

3 Claims. (Cl. 200—5)

ABSTRACT OF THE DISCLOSURE

The invention relates to a push-button controlled telephone set wherein compactness is enhanced by the positioning of the two contact sets operated by each actuator bar or link, at the same end of the links. Each link is moved in two opposite directions from a rest position, to translate respective contact sets from an inoperative to an operative condition.

Figure 1:
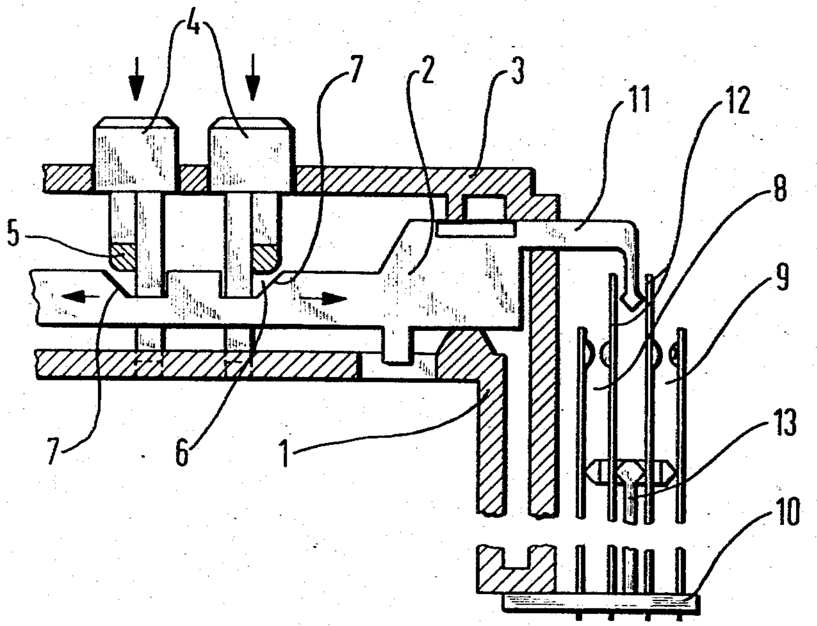

This invention concerns a push-button dial arrangement for telephone installations wherein each push-button shifts one or more links of a link set jointly assigned to the push buttons. Each of the links, at their points of engagement with the push buttons, is formed differently in such fashion that it is either moved by the push button in one or the opposite direction, or it remains stationary. Moreover, a pair of spring contact sets of a coding connection is assigned to each link, to be operated alternatively in accordance with the alternate directions of movement of the link.

The push-button dial arrangement of the invention is designed to cause the conversion of a decimal setting, such as by numbered push buttons, into a coded emission of the identification of a connection. This function is performed by the mechanical control of contacts which are located in a coding connection.

The simplification of the mechanical switch operating control system, which is a particular object of the present invention, is achieved through the positioning of both of the contact sets operated by the link at one end of the link, with the spring contacts operatively associated with an extension of the link in such fashion as to normally hold the link in its rest position. In such fashion it is possible to provide for considerable simplification of the adjustments heretofore necessary with apparatus of this kind, involving the adjustment of the contact openings of the spring contact sets, in conjunction with the positions of the links and the portions thereof which engage with the push-button elements. Moreover, it is possible with this construction of the apparatus to arrange all of the contact spring sets of the push-button dial arrangement into a unit which is attachable at one side of the dial casing, thereby reducing space needs and making it possible to employ only short connection elements for wiring purposes.

In a further form of the invention, each link has an attached actuating arm at one end thereof operative to control the contact spring sets, and that arm is provided with an offset crank arm which extends around the nearer of the contact spring sets and then into a position between the proper sets. By this construction, the necessity of extending the operating arm down from the top above the spring contact sets is avoided. Then, the ends of the links and their operating arms may be at the same height as the distal ends of the contact spring sets assigned to those links, whereby a considerable saving in space, due to the reduction in height, can be achieved. This latter is of special importance when the push button dial arrangement is to be made part of a subscriber telephone station.

Figure 2:
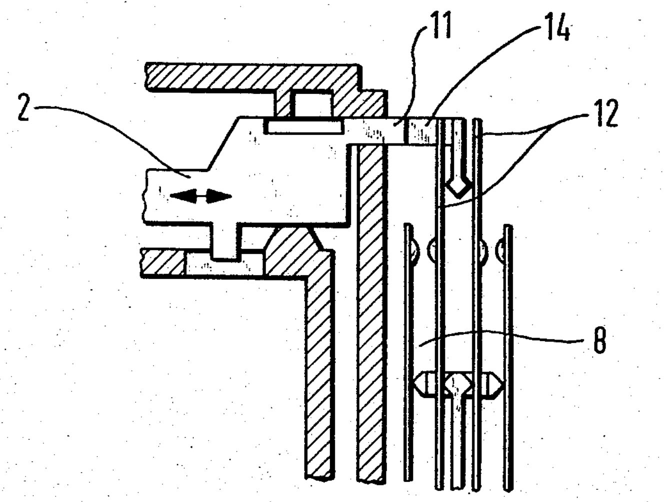

The invention will now be more fully described in conjunction with preferred embodiments thereof shown in the accompanying drawing:

In the drawing:

FIG. 1 is a diagrammatic view, partly in section, of a push-button dial arrangement in accordance with the invention; and, FIG. 2 is a partial view of a modification of the apparatus of FIG. 1, using a different form of actuating arm.

In FIG. 1 the casing 1 is shown as mounting movable links 2, only one of which is actually shown. However, a plurality of the links proportional to the number of push buttons will be employed. The arrows on the body of link 2 in FIG. 1 indicate that the link is reciprocable in opposite directions toward opposite sides of the casing.

The upper side of the casing 1 is closed by a cover 3 which also has slots therein through which extend the push buttons 4, for allowance of downward movement of the push buttons to cause actuation of the links. The push buttons of course may be arranged in a single row, or in a plurality of rows, and only two push buttons 4 are shown in FIG. 1, for simplicity's sake. Each push button has an actuation arm 5 and the links 2 are provided with recesses 6 which have differently-inclined sides 7 co-operating with the actuating arms 5. An embodiment of this principle is shown in FIG. 1, in which the left push button has an actuating arm 5 on its left side, and the corresponding recess 6 in the link 2 has an upwardly slanting side 7, such that downward movement of the left-hand push button causes movement of the actuating arm 2 to the left. The other push button shown at FIG. 1 obviously is operative to cause movement of the link 2 in the opposite direction.

It is also possible to arrange the links with sides which extend only in the direction of movement of the push buttons, so that movement of a push button into such a recess does not cause movement of the link at all.

Each of the links 2 is provided at one end thereof with an actuating arm 11 which has an operating end positioned between a pair of spring contact sets 8 and 9. These sets will obviously be contained within a coding circuit and will cause changes in certain conditions to produce dial signals, in accordance with which one of the contact sets is operated by movement of the link and its corresponding actuating arm.

All the spring contact sets 8 and 9 are arranged on the same side of the push-button dial arrangement and are grouped together by a circuit plate 10 to form a unit which is attachable on one side of the casing 1 and which carries the wiring and the electrical components of the coding circuit (not shown).

It will be seen from FIG. 1 that the contact sets 8 and 9 are provided with a common stop 13 which is operable to maintain the two contact sets with contacts disengaged, unless the link overcomes the force of the stop. The contact sets 8 and 9, by reason of their initial spring stress, also bias the link 2 toward its non-operated position, as shown in the drawing.

The apparatus is so adjusted, with the recesses and push buttons lined up, and with the actuating arms so positioned between the contact sets, that equal air gaps are present at both sides of the operating portion of the actuating arm 11. Special adjustment of the individual contact sets 8 and 9 is not necessary, and any longitudinal change in links 2 as a result of temperature has little effect on the operation of the apparatus. The clearance between the stop 13 and the contact springs 12, which are movable toward and away from the respective contact sets 8 and 9, allows adjustment in such fashion that the contact pressure remains constant with respect to the two spring sets.

FIG. 2 shows the same identical construction as FIG. 1, with the exception that the actuating arm 11 has a laterally-offset crank arm which extends around the contact spring set 8 and then into the space between the spring arms 12. The result is that, when the apparatus is connected together, the actuating arms 11 of the links 2 are positioned at the same level as the upper ends of the contact sets, so that operating space is saved.

It will be evident that many minor changes could be made in the apparatus of the invention without departure from the scope thereof. Accordingly, the invention is not to be considered limited to the embodiments actually disclosed herein, but rather only by the scope of the appended claims.

We claim:

1. In a push-button operated dial telephone signalling apparatus including links shiftable in opposite directions from a center rest position by actuation of different push buttons and including a pair of contact sets for each link respectively translated to operative from inoperative positions by movement of the link in said different directions, and a single actuating element attached to one end of each said link and extending into a position between the associated pair of contact sets, said pair of contact sets being mounted together at one side of the apparatus.

2. The apparatus of claim 1 in which said contact sets are each formed by flat spring contacts normally biased apart but each having a first contact in the path of movement of a portion of the actuating element of said link so as to cause engagement of that contact with the second contact of the set when the first contact is moved by the actuating arm.

3. The apparatus of claim 2 in which the spring contacts extend substantially perpendicularly to said links, at one end thereof, and each link has a crank arm which extends around the nearest of said first contacts and between said first contacts of the associated pair of contact sets, so that the upper ends of said actuating arms of the links may be at the same level as the upper ends of said contacts of the contact sets.

References Cited

UNITED STATES PATENTS 1,778,529 10/1930 Ide.
2,438,496 5/1948 Deakin.

FOREIGN PATENTS 807,286 1/1959 Great Britain.

ROBERT K. SCHAEFER, *Primary Examiner.*

H. BURKS, *Assistant Examiner.*